United States Patent
Murray et al.

(10) Patent No.: US 6,450,123 B1
(45) Date of Patent: Sep. 17, 2002

(54) PORTABLE, EXPANDABLE, RECTILINEAR PET CORRAL OR ENCLOSURE

(76) Inventors: Bennie Murray, P.O. Box 27811, Los Angeles, CA (US) 90027; David Murray, 3126 W. 68th St., Los Angeles, CA (US) 90043; Enoch C. Murray, 4507 2nd Ave., Los Angeles, CA (US) 90043

( * ) Notice: Subject to any disclaimer, the term of this patent is extended or adjusted under 35 U.S.C. 154(b) by 0 days.

(21) Appl. No.: 09/628,132

(22) Filed: Jul. 30, 2000

(51) Int. Cl.[7] ............ A01K 1/00; A01K 3/00; B65D 6/16

(52) U.S. Cl. .............. 119/512; 220/4.31; 119/513

(58) Field of Search .................. 119/482, 496, 119/512, 513, 514, 499; 220/4.23, 4.31

(56) References Cited

U.S. PATENT DOCUMENTS

| | | | | |
|---|---|---|---|---|
| 33,937 A | * | 12/1861 | Foote | 119/514 |
| 1,251,926 A | * | 1/1918 | Schlesinger | 119/513 |
| 2,079,458 A | * | 5/1937 | Leichtfuss | 119/499 |
| 3,651,851 A | * | 3/1972 | Curtis | 119/514 |
| 4,294,299 A | * | 10/1981 | Dorsen et al. | 220/4.23 |
| 4,809,851 A | * | 3/1989 | Oestreich, Jr. et al. | 220/4.31 |
| 5,967,089 A | * | 10/1999 | Allen | 119/513 |
| 6,003,707 A | * | 12/1999 | Rensch | 220/4.31 |

* cited by examiner

Primary Examiner—Charles T. Jordan
Assistant Examiner—Elizabeth Shaw

(57) ABSTRACT

An apparatus comprising a plurality of transportable panels detachably coupled to form a rectilinear corral when assembled suitable for confining a pet. A method comprising assembling a plurality of transportable, detachably coupled panels in the form of a rectilinear corral, and confining a pet within the corral.

13 Claims, 3 Drawing Sheets

PORTABLE, EXPANDABLE, RECTILINEAR PET CORRAL OR ENCLOSURE

BACKGROUND OF THE INVENTION

1. Field of the Invention

This invention relates to pet enclosures.

2. Background

Efforts have been made by other inventors to increase the portability of pet enclosures. These enclosures generally have included a roof and/or a floor. These containers are generally cumbersome to transport and do not offer much comfort to animals contained therein.

Other designs for pet containers utilize a wire or non-metallic mesh, a cross-thatching of metal or plastic bars, or vertical or horizontal bars as a wall access or door. Such designs require detailed knowledge of the size of openings the animal could possibly pass through. It is desirable to use a solid material to form the side panels of a portable pet corral since small animals, e.g., mice, hamsters, miniature turtles, hatchlings, and others, are capable of passing through the openings.

Another disadvantage of some pet containers relates to cleanliness. The previous inventions incorporated vertical and/or horizontal members that are difficult to clean due to the 360 degrees of surface area.

Furthermore, pet enclosures typically use detachable panels that require the use of pins, latches, springs or other movable parts. After continuous normal use, these items are often lost, broken, deformed, or suffer from wear and tear.

For the foregoing reasons, there is a need for an improved enclosure.

SUMMARY

The invention is directed to an apparatus that satisfies the need for an improved pet enclosure and a method of its use. In one embodiment, the apparatus comprises a number of transportable panels that can be easily Joined to form a rectilinear corral suitable for confining a pet. In one embodiment, the method comprises a means for assembling a number of transportable panels such that they form a rectilinear corral suitable for confining a pet.

DESCRIPTION OF THE DRAWINGS

These and other features, aspects, and advantages of the present invention will become better understood with regard to the following description, claims, and accompanying drawings where:

DETAILED DESCRIPTION

In one aspect, the invention relates to an apparatus suitable for confining a pet. The apparatus includes, in one embodiment, a plurality of transportable panels detachably coupled to form a rectilinear corral when assembled.

In a second aspect, the invention relates to a method comprising assembling a plurality of transportable, detachably coupled panels in the form of rectilinear corral, and confining a pet within a corral.

In the context of either aspect of the invention, "pet" means common household pets including, but not limited to, cats, dogs, turtles, guinea pigs, mice, rabbits, etc. "Corral" means without a floor or ceiling; and "transportable" means able to be carried by an average adult from a first location to a different second location.

In one aspect, an apparatus that is effective as a corral, is transportable, is easily assembled, and is easily disassembled is disclosed. The apparatus can be used as a pet corral, pen, fence, or barrier. Suitable locations for assembly and use can be at home, pet shows, parks, playgrounds, yards, medical facilities, transportation vehicles, and any other location where the boundary of the range of a pet's movement must be restricted and the surface is generally flat or generally level. According to a method of use, the apparatus is assembled and a pet is placed within the assembled apparatus either by lifting the pet over the apparatus and placing it inside or placing the apparatus over the pet.

In one embodiment, the apparatus pertains to a pet enclosure or corral that is portable, expandable, and easily assembled and disassembled. This invention is designed to be used as an indoor or outdoor corral when placed on a generally flat foundation. The foundation can be the ground, a floor, an automobile or truck, asphalt, grass, or many other generally flat or generally level surfaces. In one embodiment, the pet enclosure has no roof or floor. By eliminating the roof and the floor, the apparatus becomes a truly portable and easily assembled pet corral.

Figure 1:
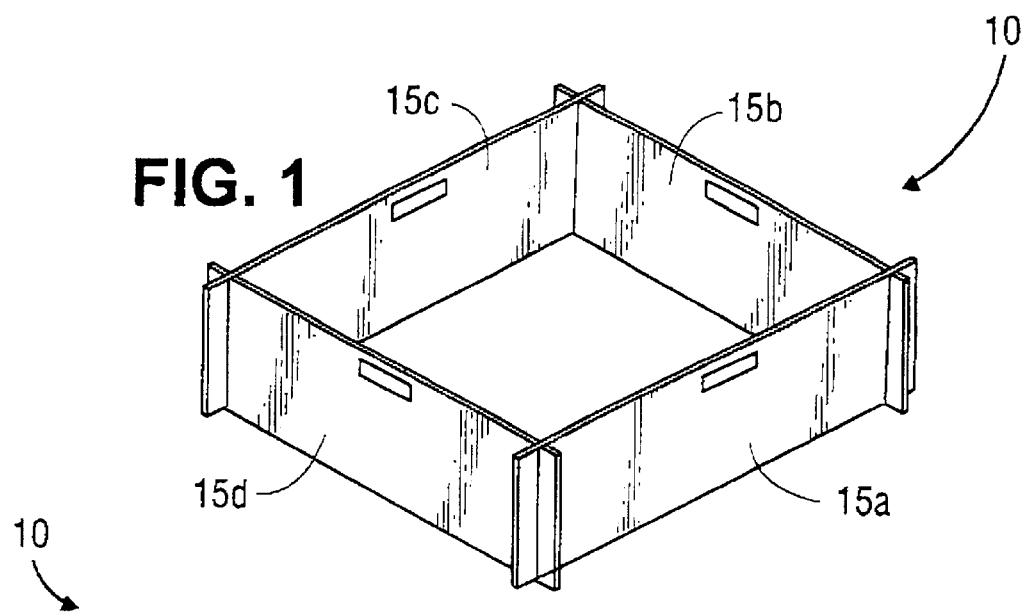
FIG. 1 illustrates a top perspective view of an embodiment of a pet enclosure or corral that has four panels coupled together.
Figure 2:
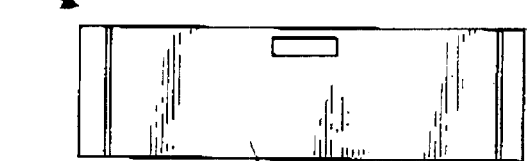
FIG. 2 illustrates a planar side view of the embodiment of FIG. 1.
Figure 4:
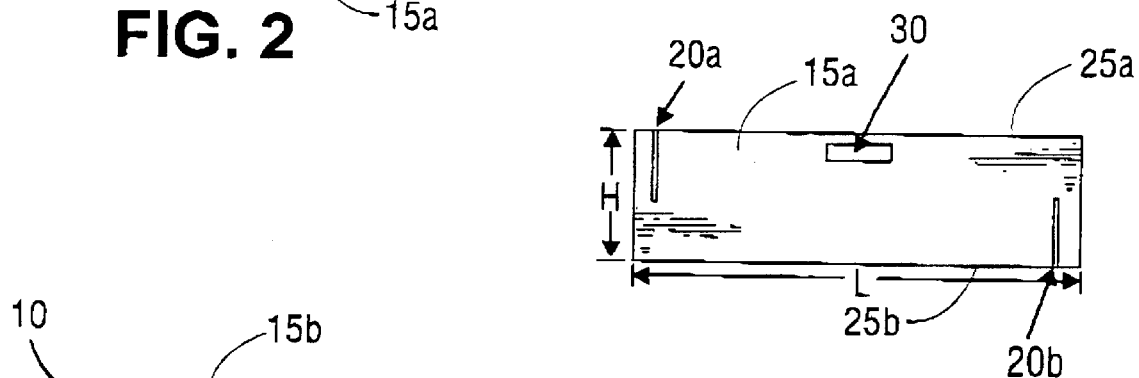
FIG. 4 illustrates a planar side view of an embodiment of a single panel of a pet enclosure or corral.
Figure 3:
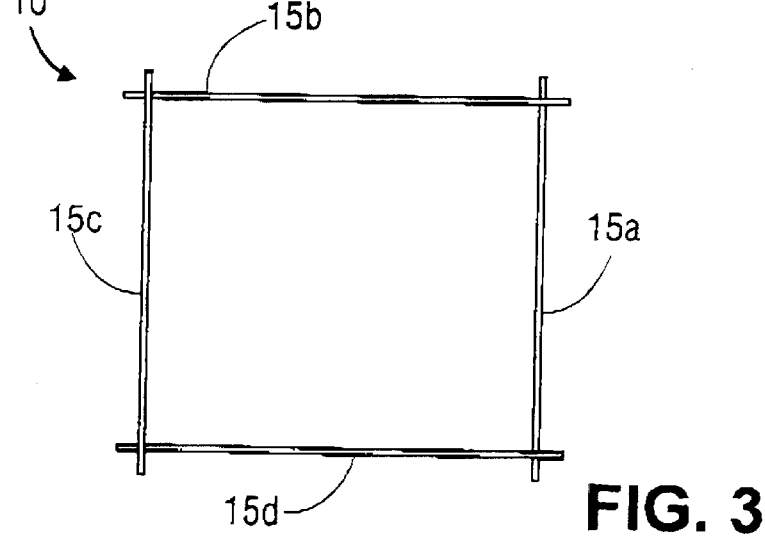
FIG. 3 illustrates a planar top view of the embodiment of FIG. 1.

Referring to FIGS. 1–3 which show an example of an assembled apparatus, apparatus 10 is made up of a plurality (more than one and in this example, four) panels 15a, 15b, 15c, and is coupled together to form an enclosure or corral. In this example, there is no floor or ceiling to the enclosure or corral. It is to be appreciated that each of panels 15a, 15b, 15c, and 15d may be manufactured in various lengths and widths to form different sized areas. An apparatus may be assembled of panels of similar or different lengths and possibly heights. FIG. 4 shows panel 15a having a length, L, and height, H.

Referring to FIG. 4, a panel has an opening 30 suitable for a human hand to grasp. Panel 15a has two slots 20a and 20b approximately 0.5 H long and, approximately 2 times the thickness of the panel material, wide on either side and opening 30 suitable for a human hand to grasp. Panel 15a also has two slots 20a and 20b formed in opposing surfaces of the panel. Slots 20a and 20b function, in one aspect, to couple panel 15a to one or more other panels (i.e., by mating slots in opposite directions). In other words, from the base of slot 20a to surface 25a is an "upward" direction, while from the base of slot 20b to surface 25b is a "downward" direction. To couple panel 15a through slot 20a, slot 20a is mated with a panel oriented at a coupling point to have a "downward" facing slot. Each slot has a width at least as wide as the thickness of a mating panel, so that when coupled/mated, the body of the panel fits within a slot of another panel.

Each panel, such as panel 15a, is made of a solid material that can be rigid or semi-rigid. One preferred material for side panels is polycarbonate. Polycarbonate is more than 200 times stronger than glass, and approximately 30 times stronger than acrylic. Side panels made of polycarbonate are shatter-resistant, tough, lightweight, and long lasting. The material is extremely ductile. It generally can be cut and drilled. It generally can withstand natural forces like severe wind, hail, and snow storms. The pet enclosure has flat and solid sides that are easily spray or wipe cleaned, without an excessive number of crevices, curves, or seams.

In the embodiment of the apparatus shown in FIGS. 1–3 and the panel of FIG. 4, the apparatus has no attached or movable parts. Therefore, the assembly and disassembly process is simpler and faster, and parts are not lost, broken, or deformed, and wear and tear is minimized. Panels are pulled apart to disassemble the enclosure or corral.

Figure 5:
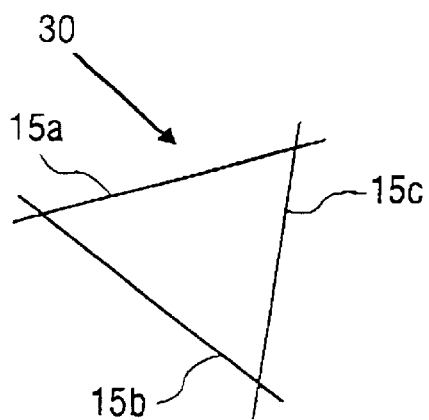
FIG. 5 illustrates a planar top view of an embodiment of a pet enclosure or corral that has three panels coupled together.
Figure 6:
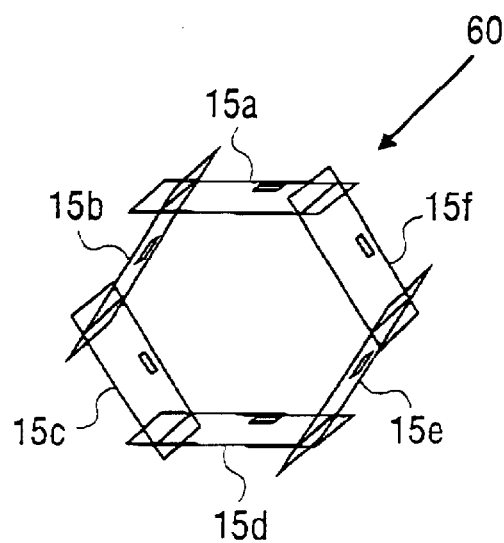
FIG. 6 illustrates a top perspective view of an embodiment of a pet enclosure or corral that has six panels coupled together.
Figure 7:
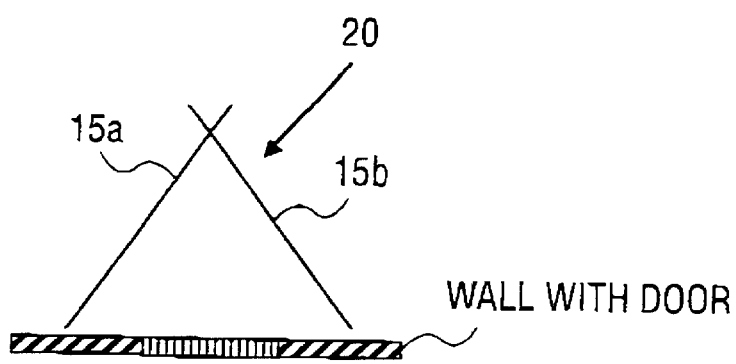
FIG. 7 illustrates a planar top view of an embodiment of a pet enclosure or corral that has two panels coupled together.

In the embodiment shown in FIG. 5, the apparatus 30 has side panels, 15a, 15b, and 15c attached to form a three-sided enclosure or corral. In the embodiment shown in FIG. 6, the apparatus 60 has side panels, 15a, 15b, 15c, 15d, 15e and 15f attached to form a six-sided enclosure or corral. In the embodiment shown in FIG. 7, the apparatus 20 has side panels, 15a and 15b, attached to form a two-sided barrier when used in conjunction with a free-standing wall with a door or opening.

Figure 8:
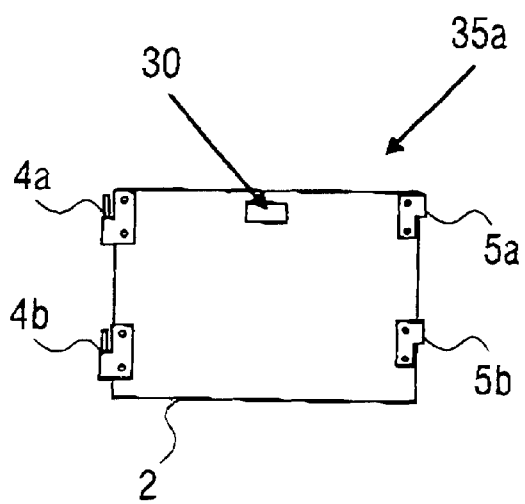
FIG. 8 illustrates a planar side view of a single side panel assembly of an alternative embodiment of a pet enclosure or corral that has hinges attached.
Figure 10:
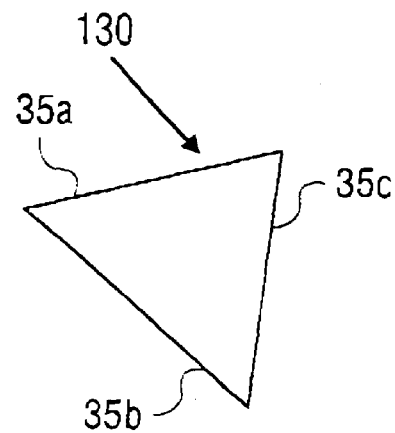
FIG. 10 illustrates a planar top view of an alternative embodiment of a pet enclosure or corral that has three panel assemblies coupled together.
Figure 9:
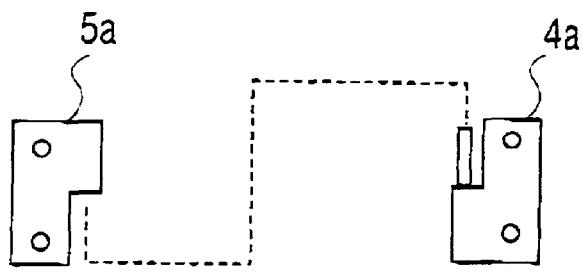
FIG. 9 illustrates a planar side view of a loose-joint or slip-joint hinge of an alternative embodiment of a pet enclosure or corral.

Referring to FIGS. 8–10, in an alternative embodiment, the slots are eliminated and loose-joint or slip-joint hinges are attached to each panel (e.g., one portion of a hinge to separate panels so that a hinge may be formed by coupling two hinge portions) for coupling the panels to one another. The use of hinges in place of the slots is desirable when using panels to accommodate larger animals. The design of loose-joint or slip-joint hinges includes no moving parts. Referring to FIG. 9, the coupling pin, is permanently attached to a first hinge portion 4a, and a mating socket is permanently attached to a second hinge portion 5a. The hinges are detachably coupled by mated pins and sockets.

Referring to FIG. 8, the side assembly 35a, a panel 2 has hinge portions 4a, 4b, 5a, and 5b attached, and an opening 30 suitable for a human hand to grasp. FIG. 10 shows the alternative embodiment of the apparatus 130 with three side assemblies, 35a, 35b, and 35c attached.

It is quite apparent that this invention provides a degree of versatility rarely seen in a portable pet enclosure. By decoupling a side panel, the multiple-sided configurations can become a corral with an opening for entrance and/or exit. Additional side panels can be added or removed to increase or decrease the size of the corral. The dimensions of the side panel can be changed during manufacture to accommodate larger or smaller pets. The materials of the side panel can be changed during manufacture to accommodate esthetics, strength and/or weight. Two panels can be coupled and the side opening remaining can be against a wall to yield a triangular apparatus. This invention can be used indoors or outdoors.

Additionally, a method comprising assembling a plurality of transportable, detachably coupled panels in the form of a rectilinear corral, and confining a pet within the corral is also desirable. In the example shown in FIGS. 1–3, a pet is simply placed within the assembled enclosure or corral. The panels, in this example, confine the pet within the enclosure or corral.

Although the present invention has been described in considerable detail with reference to certain preferred versions thereof, other versions are possible. Therefore, the spirit and scope of the claims should not be limited to the description of the preferred versions contained herein.

What is claimed is:

1. An apparatus comprising:
   a plurality of transportable panels detachably coupled to form a rectilinear corral when assembled suitable for confining a pet, wherein each of the plurality of panels has a slot and two panels are detachably coupled by mated slots, and wherein one of the plurality of panels has a first side portion and an opposing second side portion, the first side portion having a first slot formed therein and the second side having a second slot formed therein.

2. The apparatus of claim 1, wherein each of the plurality of panels has an opening suitable for a human hand to grasp.

3. The apparatus of claim 2, wherein a first of the plurality of panels has a first hinge portion and second of the plurality of panels has a second hinge portion and the first panel is coupled to the second panel by the coupling of the first hinge portion and the second hinge portion.

4. The apparatus of claim 3, wherein, when coupled, the first hinge portion and the second hinge portion define a loose-joint or slip-joint hinge.

5. The apparatus of claim 1, wherein the plurality of panels are formed from a lightweight plastic.

6. The apparatus of claim 1, wherein from an assembled corral configuration, the panels can be disassembled and transported individually.

7. The apparatus of claim 6, wherein one of the plurality of panels has a first side portion and an opposing second side portion, the first side portion having a first slot formed therein and the second side portion having a second slot formed therein.

8. An apparatus comprising:
   a plurality of transportable solid panels detachably coupled to form a rectilinear corral when assembled on a surface, and when assembled, each of the plurality of panels has a height measured from the surface that is suitable for confining a pet, wherein each of the plurality of panels has a slot and two panels are detachably coupled by mated slots, and wherein one of the plurality of panels has a first side portion and an opposing second side portion, the first side portion having a first slot formed therein and the second side portion having a second slot formed therein.

9. The apparatus of claim 8, wherein each of the plurality of panels has an opening suitable for a human hand to grasp.

10. The apparatus of claim 8, wherein the plurality of panels are formed from a lightweight plastic.

11. A method comprising:
    assembling a plurality of transportable, detachably coupled panels in the form of a rectilinear corral; and confining a pet within the corral.

12. The method of claim 11, wherein each of the plurality of panels has at least one slot and assembling comprises mating slots of two different panels.

13. The method of claim 11, wherein a first of the plurality of panels comprises a first hinge portion and a second of the plurality of panels comprises a second hinge portion and assembling comprises coupling the first hinge portion and the second hinge portion.

* * * * *